(12) United States Patent
Harhi

(10) Patent No.: US 9,413,629 B2
(45) Date of Patent: *Aug. 9, 2016

(54) ELECTRONIC ADVERSE EVENT REPORTING SYSTEM

(71) Applicant: JFH Technologies Inc, Windermere, FL (US)

(72) Inventor: James Harhi, Windermere, FL (US)

(73) Assignee: JFH TECHNOLOGIES INC., Windermere, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,573

(22) Filed: Oct. 22, 2014

(65) Prior Publication Data

US 2015/0039758 A1 Feb. 5, 2015

Related U.S. Application Data

(63) Continuation of application No. 13/648,864, filed on Oct. 10, 2012, now Pat. No. 8,898,273.

(51) Int. Cl.
*H04L 12/26* (2006.01)
*H04L 12/24* (2006.01)
*G06F 11/22* (2006.01)
*G05B 23/02* (2006.01)
*H04L 29/08* (2006.01)

(52) U.S. Cl.
CPC ............ *H04L 43/10* (2013.01); *G05B 23/0264* (2013.01); *G06F 11/2294* (2013.01); *H04L 41/12* (2013.01); *H04L 67/02* (2013.01)

(58) Field of Classification Search
CPC ....................................................... H04L 41/12
USPC .......................... 709/223, 224, 203, 217, 219
See application file for complete search history.

(56) References Cited

U.S. PATENT DOCUMENTS

| | | | | |
|---|---|---|---|---|
| 6,826,512 B2* | 11/2004 | Dara-Abrams | ..... | G06F 11/2294 702/121 |
| 7,120,686 B2 | 10/2006 | Sasabe et al. | | |
| 7,260,597 B1* | 8/2007 | Hofrichter | .......... | H04L 12/2803 707/999.01 |
| 7,464,144 B2* | 12/2008 | Hiroshige | ........... | G06F 9/44505 709/203 |
| 8,271,836 B2* | 9/2012 | Hawkins | ............. | G06F 11/0709 709/224 |
| 8,635,325 B2* | 1/2014 | Konopka | ................ | H04L 29/06 709/223 |
| 2003/0046132 A1* | 3/2003 | Keeley | ................... | G06Q 10/06 705/7.25 |
| 2005/0034029 A1* | 2/2005 | Ramberg | ............ | G06F 11/0709 714/43 |
| 2006/0230312 A1* | 10/2006 | Nichols | ................. | H04L 67/025 714/25 |
| 2012/0079100 A1* | 3/2012 | McIntyre | ............ | G06F 11/0742 709/224 |
| 2012/0208562 A1* | 8/2012 | Wilkin | ................ | H04L 41/5067 455/456.3 |
| 2013/0190095 A1* | 7/2013 | Gadher | ................. | G06F 11/008 463/42 |

* cited by examiner

*Primary Examiner* — Lashonda Jacobs

(74) *Attorney, Agent, or Firm* — Banner & Witcoff, Ltd.

(57) ABSTRACT

An adverse event reporting system and related methods are provided. Aspects relate to associating a unique identifier of a device with resolution information configured to be automatically transmitted in response to an adverse event with the device. A consumer experiencing an adverse event with a remote device may use a communications device, such as a mobile phone, to capture and/or transmit the unique identifier, which may be located on or by the device. In one embodiment, capturing or deciphering the identifier causes the communications device to be directed to a virtual address for reporting the adverse event. The unique identifier may be used to automatically transmit resolution information to a second communications device that is not associated with the consumer. The second communications device may be associated with a vendor responsible for operation of the implicated device. The resolution information may comprise the identity and/or location of the device.

20 Claims, 5 Drawing Sheets

ELECTRONIC ADVERSE EVENT REPORTING SYSTEM

CROSS REFERENCE TO RELATED APPLICATIONS

This application is a continuation and claims priority to U.S. patent application Ser. No. 13/648,864, entitled "ELECTRONIC ADVERSE EVENT REPORTING SYSTEM," filed Oct. 10, 2012, which is hereby incorporated by reference in its entirety for any and all non-limiting purposes.

BACKGROUND

Aspects of the invention relate to remote devices, such as gaming systems, and more particularly, to an apparatus and methods relating to more accurately and efficiently report incidences of adverse events with remote devices, including but not limited to entertainment and electronic video game consoles.

Electronic forms of entertainment have drastically increased over the last decade. A large part of this increase is due to rising popularity of electronic games. Particularly in today's technological computer era, arcade games and other electronic devices have become very popular. The entertainment industry continues to flourish as the public ceaselessly demands an increasing array of talent and innovation to help relax from the tumultuous reality, or simply to satisfy their specific wants. Electronic games are no longer targeted to pre-teens and teenagers, but rather are enjoyed by every possible demographic group. Many modern games now allow any user to compete and/or communicate with other players around the world.

Although these electronic forms of entertainments have increased, many mechanical games remain popular. Further, some individuals still prefer to remove themselves from reality and as such, prefer to play games without communication abilities. In this regard, many arcades still include games such as air hockey and/or skeet-ball, which historically have not included remote communication abilities.

Unfortunately, with the increasing demand for these diverse entertainment devices, it is often difficult for an entity, such as a resort, a theme park, or any business, to fully grasp the operational conditions of these machines. This may be especially true for large entities and/or entities that have several machines distributed throughout several remote locations. Many machines by their nature do not offer any remote communication, and even those that do, may malfunction or may not be operational due to environmental conditions.

Nonetheless, it is a well-accepted fact that most, if not all, mechanical or electrical devices will fail or otherwise have an adverse event during their expected lifetime of use. For example, repeated usage of a joystick may cause mechanical failure of the joystick, thus subsequent users of the machine may experience an adverse event when attempting to play the game. Similarly, malfunctioning display devices or power supplies, whether user-inflicted or not, may lead to adverse events. Unfortunately, many amusement devices remain broken or otherwise under ideal operating conditions for several hours, days or even longer, before an individual besides a potential consumer is even notified of the malfunction. Oftentimes, this leads to a negative experience for each of the potential consumers and lost revenue for one or more business entities.

Many times, machines are not configured to provide an indication of their malfunctions to an individual. Some machines may be equipped with a blinking light or audible cue, however, such indications are rarely helpful, and maintenance crews are rarely located at that location. Even when a repair representative is present, that individual may not be best-suited to address the malfunction. Indeed, one or more various mechanical, electrical and/or electrical-mechanical failures may lead to adverse events. Further, given the vast types of different electronic devices, vendors supplying the devices, and/or maintenance contracts, it is often impossible to determine what entity to contact to remedy the situation. This is especially troublesome in locations having several devices located at different physical locations. For example, fairs, malls, and amusement parks often have several different types of machines distributed throughout multiple physical locations.

For these and other reasons, there exists a need for improved systems and methods for reporting and addressing adverse events experienced at remote devices.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects relate to an adverse event reporting system. In one embodiment, the system may comprise a server or other processing device with a memory and a processor. The server or other processing device may be configured to receive an indication that a user experienced an adverse event with respect to one of several of remote devices. At least some of the devices may be amusement devices, such as arcade games. In another embodiment, the devices may comprise reservations kiosks, portable devices, mechanical entertainment devices, or a combination thereof. As used herein, "an adverse event" refers to the reduced enjoyment of an intended user due to a malfunction that diminishes the intended functionality of the device. In one embodiment, visual indicia may be placed directly one or in close proximity to a remote device, such that a consumer may view the indicia when in proximity of device. The indicia may provide a unique identifier that is unique with respect to a first device among a plurality of other remote devices. The unique identification may be unique for reporting an adverse event of the device. In yet another embodiment, the unique identification is specific to a type of adverse event.

The unique identifier of the first remote device may be associated with resolution information. The resolution information may be stored at any processing device, including for example, a remote server. Depending on the embodiment, resolution information may include, but is not limited to: an identity of the first device, a location associated with the first device, and/or at least one second communications device associated with reporting an adverse event with the first device.

In various embodiments, a remote server, such as adverse event server, or any other electronic device (including a mobile or portable device) may be configured to automatically determine that a consumer of a first communications device that transmitted information regarding the unique identifier has experienced an adverse event with the first device. In response, one or more second communications devices may be selected to transmit an electronic notification of the adverse event to. This may be performed automatically upon receiving the first unique identifier from the first communications device. The detection or analysis of the first indicia of the first remote device may cause the first communications device (and/or the first remote device itself) to be directed to a first virtual address that is specific to reporting adverse events of the first remote electronic device. The virtual address may cause an output (visual and/or audio) to be presented on the first communications device and/or the first remote device. The virtual address may be associated with the resolution information of the first device. A consumer may be directed to a virtual address before the selection of the second communications device to transmit an electronic notification to.

In certain embodiments of the invention, the present invention can be partially or wholly implemented with a computer-readable medium, for example, by storing computer-executable instructions or modules, or by utilizing computer-readable data structures. Of course, the methods and systems of the above-referenced embodiments may also include other additional elements, steps, computer-executable instructions, or computer-readable data structures. These and other aspects of the embodiments are discussed in greater detail throughout this disclosure, including the accompanying drawings. Additional features and advantages of the invention will be apparent upon reviewing the following detailed description.

BRIEF DESCRIPTION

Figure 1:
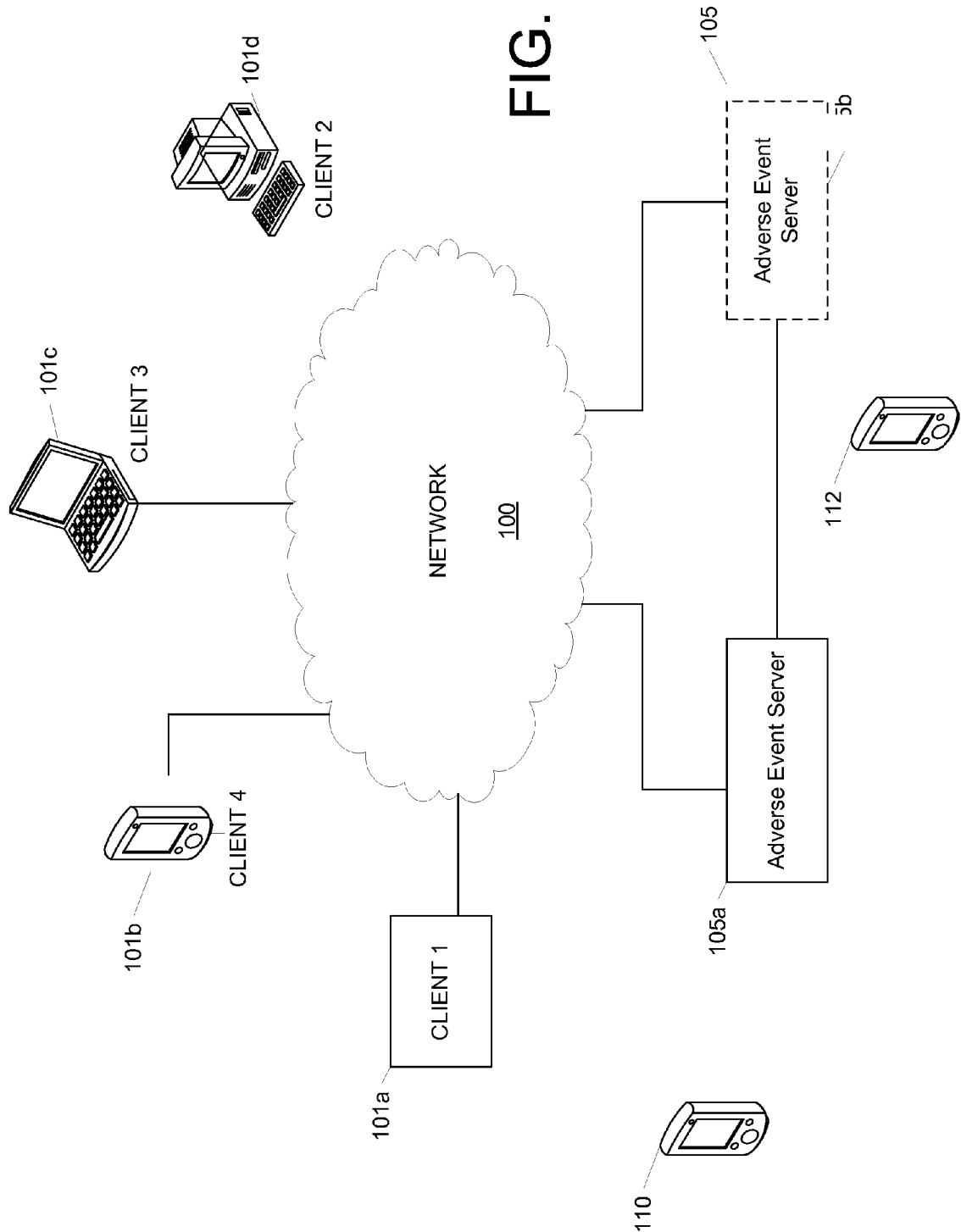
FIG. 1 depicts an illustrative network environment that may be utilized in accordance with various embodiments.
Figure 3:
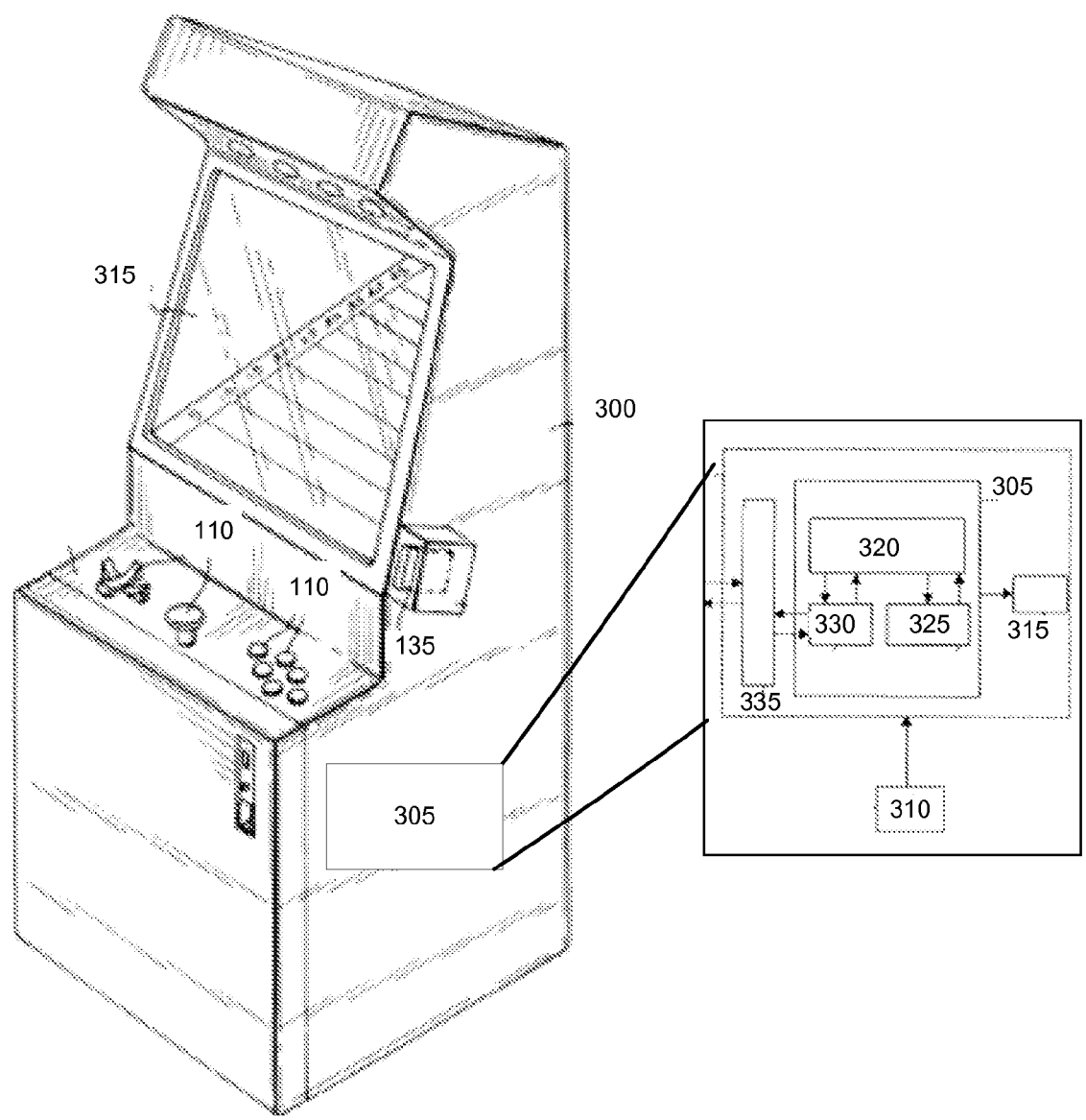
Figure 4A:
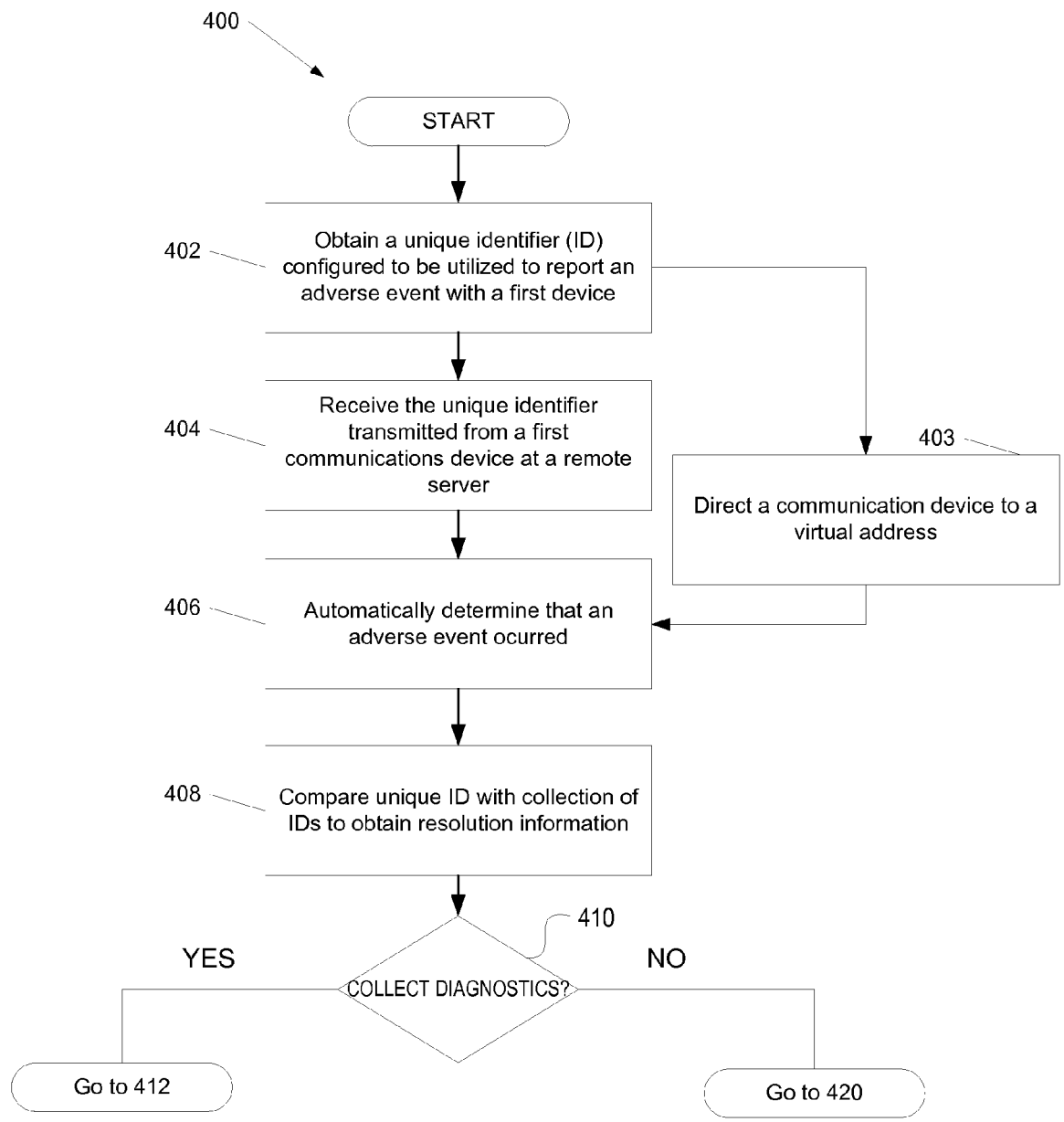
Figure 4B:
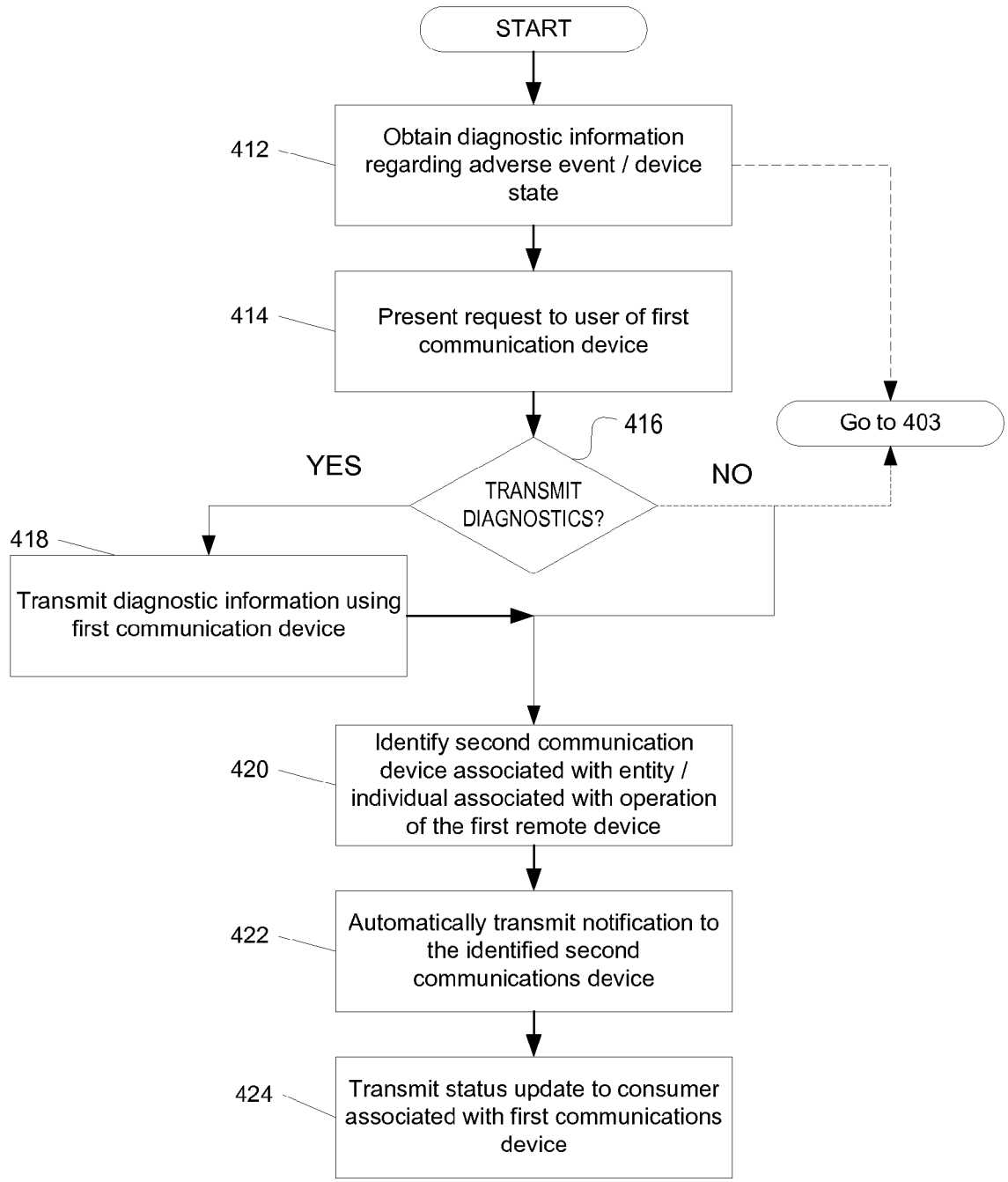

FIG. 3 illustrate an example arcade-style gaming device that may be part of a network environment, such as the network environment of FIG. 1, in accordance with one embodiment; and FIG. 4 is a flowchart of an exemplary method of reporting an adverse event according to various embodiments. Specifically FIG. 4A is a flowchart comprising illustrative processes for obtaining a unique identifier from a remote device in accordance with one embodiment and FIG. 4B is a flowchart comprising illustrative processes for transmitting notifications in accordance with one embodiment of this disclosure.

DETAILED DESCRIPTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention. Further, headings within this disclosure should not be considered as limiting aspects of the disclosure. Those skilled in the art with the benefit of this disclosure will appreciate that the example embodiments are not limited to the example headings.

I. Illustrative Environment

A. Illustrative Network Environment

FIG. 1 illustrates an illustrative network environment that may be utilized in accordance with various embodiments. The illustrated environment of FIG. 1 may be utilized in the operation of one or more adverse event reporting system, such as those disclosed herein. As seen in FIG. 1, a plurality of clients (101a-101d, collectively 101) may interact with one or more adverse event servers (105a-105b, collectively 105). In certain embodiments, only a portion of clients 101 (such as clients 101a and 101b) are configured to communicate with any remote device, such as server 105. In another embodiment, one client (e.g., client 101a) may be configured to communicate with a first server (e.g., server 105a) and not a second server (e.g., 105b). In one embodiment, at least one client is configured to communicate with a remote device that another client is not configured to communicate with. In other embodiments, at least one client may be configured without a communications adapter or other mechanism which would permit electronic communication with any other device. Exemplary mechanisms for remote communication will be discussed below.

Clients 101 may include a variety of devices including any generic data processing device, personal computer (PC), laptop, portable, or netbook computer, personal data assistant or mobile device 101d, and/or any mobile communications device. In one embodiment discussed below in relation to FIG. 3, at least one client may be an arcade-style video game console. One or more of clients 101 may have a network adapter or transceiver that allows the client 101 to connect to adverse event servers 105 through network 100. In one example, network 100 may include an Internet Protocol (IP) based network, e.g., the Internet. Other networks may include, but are not limited to: cellular networks, cable networks, fiber optic networks, wireless networks, wired network and/or combinations thereof. Network 100 may further include one or more sub-networks such as wired or wireless local area networks (LANs) and the like. Further, although a single network is shown (e.g., network 100), those skilled in the art will appreciate that a plurality of networks may be utilized. In this regard, a first client (e.g., 101a) may be configured to communicate through a first network or communication protocol and a second client (e.g., 101b) may be configured to communicate through a second network or network protocol. The first and second networks and/or communication protocols may be mutually exclusive in certain embodiments. Yet in other embodiments, they may be part of a cohesive web of interconnected communication pathways.

One or more adverse event servers 105a/105b may be a similar data processing device as one or more of clients 101, and/or may include specialized server hardware. In one embodiment, each virtual server is at the same physical location, yet in other embodiments, one or more server 105a/105b may be located remotely from another server and operatively connected through network 100 or another network (not shown). In other embodiments, a single powerful server 105a could run multiple adverse event reporting systems, or several less powerful servers 105a and 105b could be connected in a cluster to work together to run one large adverse event reporting system. Those skilled in the art will appreciate that a single server 105a or 105b may comprise a processor and a tangible non-transitory computer-readable medium that may contain computer-executable instructions. The instructions may be executed by the processor on the server 105 or by any other processor within the environment. Computer-implemented instructions on one more non-transitory memories on server 105 may include algorithms and other data for interactions that are available in the adverse event reporting system. Exemplary hardware and software for an example client device 101 and/or adverse event server 105 of the network environment is shown in FIG. 2.

B. Illustrative Client and Server Devices

Figure 2:
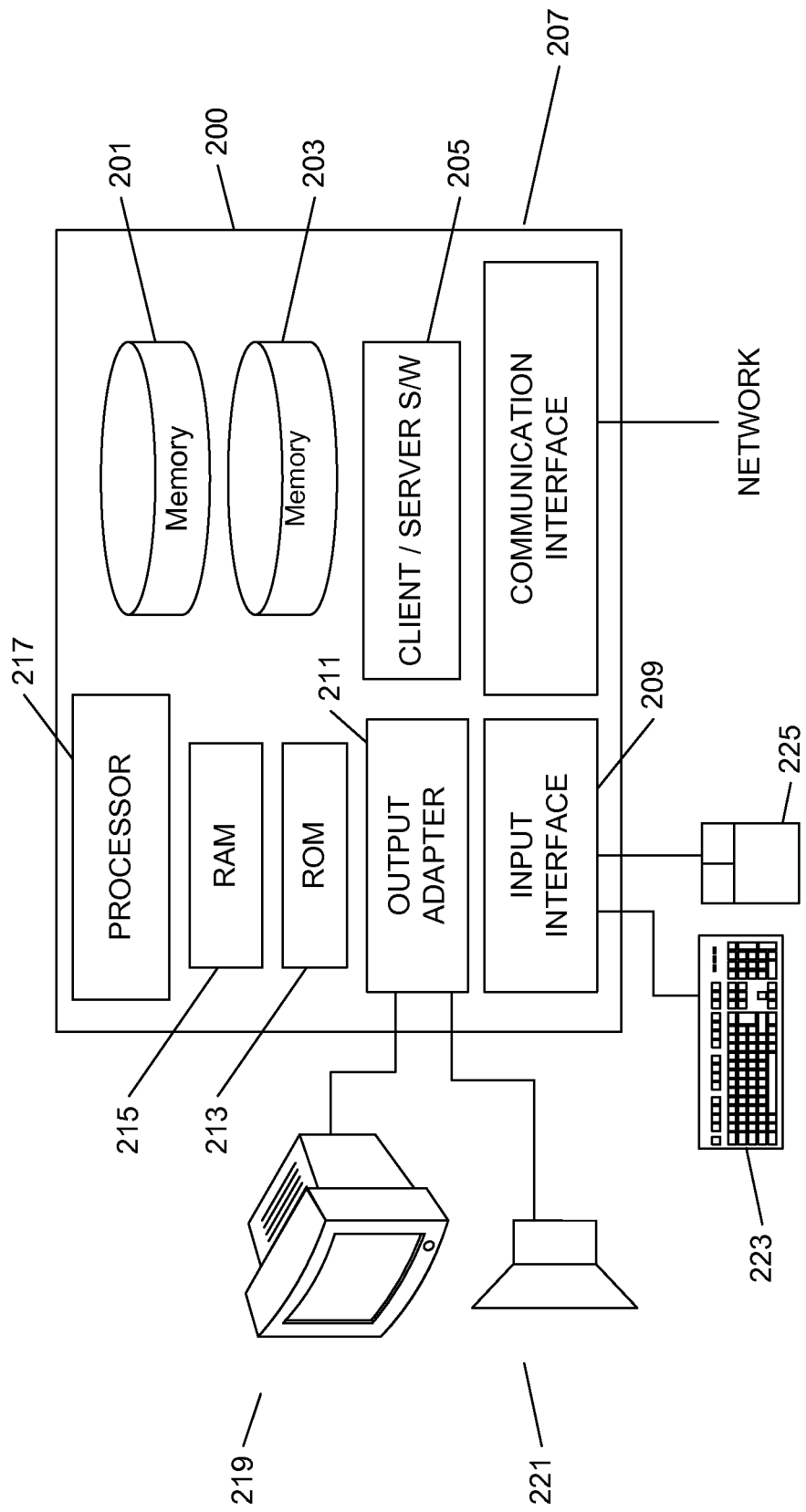
FIG. 2 illustrates an example processing device that may be used in a network environment, such as either a client device or a server in the network environment of FIG. 1, in accordance with one embodiment.

FIG. 2 illustrates an example client device 200 such as client 101d or server 105a (each shown in FIG. 1). Device 200 may include a variety of components and modules including a processor 217, random access memory (RAM) 215, read only memory (ROM) 213, memories 201 and 203, which may include one or more collections of data, such as databases, client or server software 205, output adapter 211, input interface 209 and communication interface 207. Processor 217 may include a graphics processing unit (GPU) or a separate GPU may be included in the output adapter 211. Memory 201 may be configured to store electronic data, inclusive of any electronic information disclosed herein. Another memory, such as memory 203, may be configured to store different or overlapping data. In one embodiment, memories 201 and 203 may be a single, non-transitory computer-readable medium. Each memory 201, 203 may or may not include a database to store data or include data stored in RAM memory, accessed as needed by the client/server software. Data associated with the adverse event reporting system may be communicated between client device 200 and an adverse event server (such as server(s) 105) through a transceiver or network interface, such as communication interface 207.

One or more non-transitory computer-readable mediums, such as medium 201 or 203 may be configured to contain client/server software (graphically shown as software 205). The client software 205 may, in one or more arrangements, be configured to operate an adverse event reporting system and components thereof as well as facilitate or direct communications between two devices, including remote devices (101a-101d) and/or communications devices (110 and 112), among other devices. In those embodiments in which device 200 is a client device, such as client 101a, a user may control the device, such as during gameplay, through input interface 209 using various types of input devices including keyboard 223 and mouse 225. Other types of input devices may include a microphone (e.g., for voice communications over the network), joysticks, motion sensing devices, touchscreens 219 and/or combinations thereof. In one or more arrangements, music or other audio such as speech may be included as part of the adverse event reporting system. In such instances, the audio may be outputted through speaker 221.

Software 205, computer executable instructions, and other data used by processor 217 and other components of client device 200 may be stored in memories, 201, 203, RAM 215, ROM 213 or a combination thereof. Other types of memory may also be used, including both volatile and nonvolatile memory. Software 205 may be stored within RAM 215, ROM 213 and/or memories 201 and 203 to provide instructions to processor 217 such that when the instructions are executed, processor 217, device 200 and/or other components thereof are caused to perform functions and methods described herein. In one example, instructions for generating a user interface for interfacing with an adverse event server 105a or client device 101a may be stored in RAM 215, ROM 213 and/or databases 201 and 203. Software 205 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like.

C. Example Arcade-Style Remote Device

In certain embodiments, device 200 may be a remote arcade-style amusement device. An exemplary arcade-style configuration of an amusement device is illustrated in FIG. 3. The arcade video game device 300 may include one or more of the components shown in FIG. 2. The illustrative video game device 300 includes a control unit 305, a user controller 310, and a display 315, which may be housed in the same arcade game cabinet as the control unit 305 and the user controller 310. Within this cabinet, the user controller 310 and the display 315 may be connected to the control unit 305. A central processing unit 320 in the control unit 305 may be configured to execute a program in accordance with the present invention stored on a non-transitory computer-readable medium, such as a local medium 325, or other storage media, to create a visual representation on the display 315. The central processing unit 320 may also execute user-defined instructions stored in a random access memory 315. During game play, the user controller 310 may be operated by a user to cause the control unit 305 to vary the visual representation on the display 315. Optionally, the configuration may include additional input/output sources (see, e.g. 335), such as, for example, LAN, WLAN, or interfaces as known in the art, for example, as illustrated in FIG. 2. While the exemplary embodiment illustrates an arcade-style configuration, the invention, however, may be configured for personal gaming systems, such as Sony® Playstation® or Microsoft® Xbox®, handheld systems such as the Apple® iPhone®, Microsoft® Windows®, or Google® Android® mobile platform, among others, for example, cellular-based applications.

II. Example Adverse Event Reporting Methodologies

A. Introduction

Aspects of this disclosure relate to operating an adverse event reporting system having at least two remote devices. It is a well-accepted fact that most, if not all, mechanical or electrical devices will fail or otherwise have an adverse event, during their expected lifetime of use. Adverse events with a specific machine leads to reduced enjoyment with respect to the specific machine. Oftentimes, the negative experience is associated with the location or business providing access to the machine. For example, a consumer who experiences an adverse event with an arcade game at an upscale resort may have a negative image not only of the game or the manufacturer of the arcade game but also of the resort itself. This problem is not limited to amusement devices, but many businesses provide services or products through remote devices. Thus, malfunctioning remote devices not only have the potential to lower revenue through decreased transactions, but also the loss of consumer confidence, trust, and repeat business. This is especially true if the device is not fixed, thus leading to multiple adverse events.

Many times, remote devices are not configured to provide an indication of their malfunctions to an individual. This is further compounded by the fact that, although one or more remote devices, such as client 101a shown in FIG. 1, may be configured to electronically communicate with other machines, any such communication mechanisms may: (1) not be configured to detect or report malfunctions; (2) be inoperable due to the malfunction; (3) be inoperable due to environmental and/or installation conditions; (4) otherwise not have an option. Further, some devices, such as client 101d, may not be tied to any network, such as network 100, thus not configured to transmit or receive electronic information that may be helpful to detect malfunctions or collect diagnostic information utilized to identify and/or remedy the malfunction. For example, client 101d may be a purely mechanical device and/or does not have a communications interface allowing for communication with another device.

FIG. 4, comprising FIGS. 4A and 4B, shows flowchart 400 of an exemplary method that may be implemented with an exemplary adverse reporting system, such as with one or more of the components shown in FIGS. 1-3. As one skilled in the art will appreciate, one or more of the blocks shown flowchart 400 may be performed with a variety of systems; however, to aid the reader in understanding this disclosure, flowchart 400 will be described by way of illustrating the exemplary embodiments disclosed in FIGS. 1-3. Moreover, the disclosed methods may comprise more or fewer steps, as it is understood the exemplary steps illustrate just one embodiment. It is further understood that the arrangement of flowchart 400 is merely for illustrative purposes and any methods discussed in relation to flowchart 400 (or any other method disclosed herein) may be conducted before, during, or after any other method.

A. Unique Identification Systems and Methods

Certain aspects of this disclosure relate to permitting a consumer to utilize their communications device, such as a mobile phone, pager, or tablet, to readily obtain a unique identifier from a malfunctioning device and, based upon the unique identifier, cause the transmission of a message that is automatically routed to a specific communication device of an entity responsible for remedying the malfunction of the device. As used herein, a communications device is any electronic device configured to access to at least one electronic communications network, such as but not limited to, network 100. Despite the fact a communications device may transmit and/or receive data through the same network as a remote device (e.g., client devices 101a-101d), the communications device is not one of the plurality of remote devices. As will be explained below, the consumer's communications device is not associated with a unique identifier tied to resolution information configured to provide notification to a second communication device about an adverse event with the consumer's communications device.

In accordance with one embodiment, a communications device of a consumer experiencing the adverse event may be utilized to transmit an electronic indication that a specific device (such as client 101a of FIG. 1) is malfunctioning. The indication may be utilized to transmit a notice to a second communications device. The second communications device (e.g., device 112) may be associated with an entity or an individual responsible for remedying the malfunctioning device. Thus, in certain embodiments, the entity or individual responsible for remedying the malfunction may be directly notified as a result of the consumer's transmission of electronic information without the consumer or operator of the first communications device knowing either: (1) any contact information for the second communications device; or (2) the individual or entity responsible for remedying the malfunction.

As indicated in flowchart 400, block 402 may be initiated to receive a unique identifier from the remote device (e.g. client 101a). In one embodiment, client 101a (or any of a plurality of devices, such as any of clients 101a-101d) may be associated with visual indicia indicating a unique identifier. The visual indicia may be located, for example, on a housing, or viewable surface of the remote device 101a. In various embodiments, the unique identifier may be a collection of alphanumeric characters, physical features, and/or an electronically-derived or displayed identifier. In one embodiment, a consumer may use one or more input devices, such as a touchscreen 219 and/or keyboard 223, to collect the unique identifier which may then be transmitted through one or more communication pathways, such as through network 100. In yet another embodiment, a unique identifier may be derived from image data electronically captured by a digital image sensor of the first communications device 110. For example, in one embodiment, the communications device 110 may comprise a digital camera configured to capture images. In one such embodiment, the digital camera may be configured to capture information from a 2 or 3-dimensional digital image. The communications device 110 may be configured to analyze data of the captured image (which may be of a code, such as a bar code, a response code, including for example: Quick Response Code (QR Code®), Datamatrix, BeeTAGG, MS Tag, SnapTag, JagTag, or any other code(s)). For example, communication device 110 may comprise a processor configured to determine orientation of the code within the image, and/or normalize image size, capture angle, and/or convert the image data to binary format or otherwise any data other than what is viewable with the human eye from the image. Yet in other embodiments, image data may be transmitted to a remote processor, such as a processor of adverse event server 105 (discussed below) for deriving any portion of information from the image.

Certain embodiments may utilize a unique identifier associated with each of a plurality of remote electronic devices (such as each of clients 101a-101d) regardless of the type of device. For example, client 101a may be a remote portable gaming device configured to be used in a location having a defined area, client 101b may be a stationary cabinet-style arcade game located at a fixed location, such as device 300 shown in FIG. 3, and client 101c may be a mechanical gaming device that is not configured to communicate with any other device. Further, one device may comprise a unique identifier affixed to the body of the device itself, a second device may be configured to display the unique identifier on a display device, such as a screen, a third device may be configured to have an indicia or other marking that is configured to be analyzed by a digital processor. As used herein, reference to a plurality of remote devices refers to a collection of devices comprising at least a first device and a second device, wherein (1) all of the electronic devices are remote with respect to at least another one of the remote devices or an adverse event server; and (2) the first communications device is not one of the plurality of remote devices.

In certain embodiments, one or more of the plurality of remote devices, such as clients 101a-101d may be associated with an indicia, which may be graphical in nature. For example, in one embodiment, the indicia may be a graphical rendition comprising a computer-scannable code and yet in another embodiment, an indicia may consist of the computer-scannable code. The scannable code may be configured to be optically read, including visible and/or non-visible wavelengths, wirelessly, and/or including near-field transmissions. In certain embodiments, the scannable code is configured that, when scanned by a scanning device, provides the unique identifier. For example, in one embodiment, the scannable code may comprise a 2-D code affixed to a body of an electronic gaming device, such as a cabinet-style arcade game located at a first commercial establishment. The 2-D code may be configured to be read by an image capturing device located on a mobile communications device, such as first communications device 110. For example, it's become common for mobile handsets to include cameras. Further, modern mobile handsets and other devices may further include one or more non-transitory computer-readable mediums comprising computer-executable instructions that when executed by a processor (which may or may not be located on the same mobile device) could be configured to decipher values from a captured image. The values may be unrelated to the color and/or intensity of the pixels data. Yet in other embodiments, the specific hue, color, intensity, or other properties of the pixel values may be used to identify the specific device with respect to another of the plurality of devices. In one embodiment, the unique identifier of the respective devices may be provided within the deciphered string of values.

B. Indications of Adverse Events

Further aspects of this disclosure relate to receiving an indication of an adverse event at one of the remote devices (e.g., clients 101a-101d) from a communications device, and automatically determining that an adverse event occurred at a specific remote device.

In accordance with one embodiment, a communications device, such as the first communications device 110, may be directed (or caused to be directed) to a first virtual address specific to the first unique code (e.g., block 403), wherein the first virtual address is configured to receive adverse event information from a consumer that experienced an adverse event with the specific device associated with the unique code. In various embodiments, the deciphered code may be utilized to provide a virtual address to the user of the first communications device 110. The virtual address may be a Universal Resource Locator (URL). In another embodiment, the virtual address may be one or more of any targeted communication addresses, including an email address, a chat profile address, a text message address, or the like. The virtual address may be a unique virtual address that is specifically assigned to an adverse event with the specific device (e.g., client 101a). For example, the virtual address may be configured to be utilized only upon a user intentionally attempting to report an adverse event with that specific device. Thus, the virtual address may not be intended for general feedback or comments. In this regard, for certain implementation it may be assumed that any instantiations of the virtual address are for reporting an adverse event for a specific device. In this regard, any indication of a user being provided the virtual address may be considered reporting of an adverse event for that specific device.

In certain embodiments, the capturing and/or deciphering of the unique code by the first communications device 110 may cause a second device, such as a customer services kiosk in proximity to the malfunctioning device, to be directed to the assigned virtual address. For example, a kiosk may be provided with a larger or more precise input device than the consumer may have available on the first communications device 110. Therefore, it may be more convenient for the consumer to utilize a device other than their communications device 110. Those skilled in the art will appreciate that other factors may contribute to the consumer utilizing the kiosk or other device, such as network usage costs, available bandwidth, or any other factor(s). In one embodiment, the consumer may be presented with an option to select between using the first communications device 110 or another device. Although the term "kiosk" was utilized, those skilled in the art will further appreciate that any other device configured to direct the consumer to the assigned virtual address is within the scope of this disclosure.

In other embodiments, the virtual address may provide an adverse event field to the consumer. The adverse event field may be utilized to obtain information regarding the adverse event. In one embodiment, a user may utilize an input device, such as input devices 219, 223, 225 or any other mechanism, to provide information regarding the adverse event. In some embodiments, the adverse event field may be configured to receive alphanumeric characters. In other embodiments, the adverse event field may be configured to receive diagnostic information from the remote device in which the consumer experienced an adverse event. Those skilled in the art will appreciate that these are merely examples intended for illustrative purposes and that this disclosure is not limited to specific field parameters. The adverse event server 105 may host a virtual destination associated with the virtual address. In one embodiment, information contained in the adverse event field may be received and stored on a memory of adverse event server 105.

C. Adverse Event Server

Regardless of whether block 403 was invoked, certain embodiments may transmit electronic information relating to the adverse event to a remote location, such as a remote server. In certain embodiments, block 403 may only be invoked after reception of electronic information at a remote server indicative of the adverse event. In this regard, those skilled in the art will readily appreciate that block 403 may be invoked before, during, or after any other block disclosed herein, including but not limited to blocks 402-418 and/or decisions 410 and 416 discussed in relation to FIGS. 4A and 4B. As one example, shown by block 404, electronic information relating to an adverse event with a first electronic device (e.g., client 101a) of a plurality of electronic devices (e.g., clients 101a-101d) may be received at one or more remote locations, such as for example, at adverse event server 105. In one embodiment, at least a portion of the received electronic information may have been transmitted from the first communications device 110 of the consumer. In one embodiment, the remote location(s) (e.g., server 105a/105b) may be configured to receive information via multiple communication pathways. In certain embodiments, the first communications device 110 is not preauthorized as part of the adverse reporting system, such as the system shown in FIG. 1. For example, one or more computer-readable mediums, such as one or more of ROM 213, RAM 215, or memories 201/203 may have authorization information that permits users and/or specific devices to log in or authorize access to communications pathways of the system 100. However, if communications device 110 is merely a consumer's device, it will not likely be authorized or even recognized by the remote server 105. Thus, embodiments disclosed herein contemplate receiving (and taking action) based upon information received from a previously-unknown and/or unauthorized device. However, further embodiments may not require a user (and/or device) to be pre-registered before reporting an adverse event.

In certain embodiments, the remote electronic device (e.g., client 101a) may not be configured or otherwise able to communicate with the remote server 105 or device configured to receive notification of the adverse event of the remote device. For example, client 101a may not be configured to communicate with any remote devices. This may be the case, for example, if client 101a is purely mechanical, does not have a network interface, is malfunctioning, or is installed in a location that does not accommodate the communication pathway. In certain embodiments, a first communication pathway may be utilized to receive electronic information from the first communications device 110 of the consumer, and a second communication pathway is utilized when the information is received at the remote server (e.g., server 105).

Electronic information received at the remote location (e.g., server 105) may comprise a first unique identifier specific to the one device of a plurality of remote electronic devices in which the adverse event was experienced. In yet other embodiments, the electronic information may comprise data derived from the unique identifier. In yet further embodiments, the electronic information may comprise data from which the unique identifier may be derived. In one embodiment, the information received at the adverse event server 105 may be solely derived from image data electronically captured by a digital image sensor of the first communications device. In one embodiment, only the unique identifier is received at the adverse reporting server 105.

Based upon the reception of the electronic information, it may be automatically determined that a consumer of the first communications device has experienced an adverse event with a specific remote electronic device (See, e.g. block 406). For example, reception of the first unique identifier (or any equivalent information able to distinguish a first device from any other of the plurality of devices) at the adverse event server 105, may cause a processor (such as processor 217 of FIG. 2) to automatically determine the occurrence of the adverse event without human interference. In certain embodiments, the determination at block 406 may be performed without any further checks or processes, but rather, reception of the unique identifier (or equivalent information) may consist of the full determination that an adverse event occurred with respect to the identified remote device. Further aspects of this disclosure may determine, based upon the received information, the type of adverse event and/or trigger processes for the collection of diagnostic information, however, are not required. Examples of such processes will be described below in relation to block 410, among other disclosure.

In this regard, the remote device which experienced the malfunction or otherwise associated with the adverse event may itself be directed to the virtual address. For example, if a consumer experiences an adverse event with client 101*b*, that consumer may utilize their first communications device 110 to obtain the unique identifier from client 101*b* (see, e.g., block 402), which may cause the malfunctioning device to be directed to a virtual address specifically for adverse event reporting.

Block 408 may be implemented to compare the received first unique identifier (or equivalent information) with a collection of unique identifiers stored on a non-transitory computer-readable medium. For example, a processor of adverse reporting server 105 may access a collection of information (e.g., a database which may be stored on any memory, including but not limited to memories 201, 203 213, 215) that associates the unique identifiers with specific remote devices. The computer-executable instructions may be stored for example at server software 205 of FIG. 2. The processor may utilize the identifier (or equivalent information) associated with one of the plurality of remote electronic devices to determine the first unique identifier is linked with resolution information of the first electronic device.

The resolution information may be stored on any remote or local non-transitory computer-readable medium. In one embodiment, resolution information may comprise an identity of the first electronic device associated with the adverse event, and a first location associated with the first electronic device. For example, illustrative resolution information of client 101*a* may comprise: "pinball machine, amusement park 1, exhibit B". In another embodiment, resolution information of client 101*a* may include "pinball machine by manufacturer 1, lobby". Resolution information may include further identifying information, including installation notes, maintenance information, or any other information relating to the specific machine. As would be appreciated by those skilled in the art, the unique identifiers and/or the resolution information may be stored in any format and arrangement, including but not limited to, plain text, ASCII, and/or a proprietary format.

Either independently or as part of block 408 (or any other process disclosed herein), decision 410 may be initiated to determine whether to collect diagnostic information regarding the adverse event. The determination may include factors such as whether: the remote device can be remotely diagnosed through one or more communication pathways, the type of device, the location of the device, subscription levels to diagnostic services, and/or combinations thereof. In certain embodiments, block 408 may be omitted. In one instance, diagnostic information may be automatically requested or received based upon a trigger, such as reception of information collected as part of the user being directed to a virtual address (e.g., block 403), upon receiving the unique identifier (e.g., at block 404) and/or upon determining the resolution information (e.g., at block 408).

Whether diagnostic information is automatically received or determined to be requested as part of decision 410, block 412 may be initiated to obtain diagnostic information regarding the adverse event. In one embodiment, block 412 may be automatically initiated after identifying the first electronic device from the information received at block 408.

Those of ordinary skill in the art will appreciate that diagnostic information may be obtained absent block 412 or supplemented through this or any other mechanism. For example, the electronic information received at block 402 (or any other mechanism) may comprise a diagnostic information field. For example, a user of the first communications device 110 may input diagnostic information into a diagnostic information field (either as part of or independent of block 403) before transmitting the information to the remote server. Information obtained from block 412 may be different or overlap diagnostic information obtained from another source or instance (such as part of a user providing information when visiting the virtual address referenced in block 403).

In one embodiment, an electronic signal may be transmitted to the first electronic device configured to obtain diagnostic information from the first electronic device. The electronic signal may be configured to run a diagnostic test of at least one component of the first electronic device 101*a*. In one embodiment, diagnostic information, including a code, may be displayed on a local display device of the first electronic device. In one embodiment, instructions may be provided to a user of the first communications device 110 to input the diagnostic information into an adverse event field of electronic information to be transmitted to the remote server (such as server 105). Diagnostic information may be received in the adverse event field of the electronic information or through a different mechanism transmitted through the same or different communication pathway as the unique identifier.

D. Requesting User Action

Certain embodiments may utilize the first communications device 110 to collect and/or receive diagnostic information regarding the first remote device 101*a*. In one embodiment, a request may be presented to a user of the first communications device 110 regarding the collection of diagnostic information (see, e.g., block 414). In one embodiment, such requests may be considered part of block 412. In further embodiments, requests may be transmitted after collecting at least a portion of diagnostic information. Those skilled in the art will appreciate that collection of a first portion of diagnostic information may comprise transmitting a request to a user and yet a second portion may be obtained without requesting the user perform any action. For example, after identifying the first electronic device 101*a*, a request may be displayed on at least one of a local display device of the first electronic device 101a or a local display device of the first communications device 110, requesting the user to perform a physical activity regarding the first electronic device 101a. For example, the request may request the user to press a button, enable a feature of the device, reset power to the device, transmit information regarding their observations regarding the malfunctioning of the electronic device 101a, or other nearby devices for comparison purposes. In certain embodiments, the request may include requesting that the user capture images of the first electronic device 101a, including, for example, any error codes displayed on a display device of the device 101a.

Decision 416 may be utilized in accordance with certain embodiments to obtain permission from a user to control or otherwise utilize a capability of the first communications device 110. For example, in one embodiment, decision 416 may determine whether permission exists (or seek permission) to utilize the first communications device to transmit diagnostic information. In one embodiment, decision 416 may be part of block 414 or any other process described herein. In another embodiment, decision 416 may be implemented to obtain permission to utilize bandwidth from transmitting the information gathered as part of block 414 or any other mechanism described herein or known in the art. In one embodiment, decision 416 may be implemented any time after using the unique identifier to identify the first electronic device 101a, and result in a request to be displayed on at least one of a local display device of the first electronic device 101a or a local display device of the first communications device 110, requesting permission to utilize a communication pathway of the first communications device to transmit diagnostic information regarding the first electronic device 101a. Block 418 may be utilized to receive diagnostic information that is transmitted by the first communications device 101a. The diagnostic information may be received at adverse event server 105 and/or at any device comprising a computer-readable medium and a processor.

E. Routing Notifications of Adverse Events

Further aspects of this disclosure relate to notifying an individual or entity of the adverse event involving the first electronic device 101a. Certain embodiments are directed towards transmitting a notification to a specific communications device that is not the first communication device. Looking to illustrative block 420, a second communication device (such as device 112 shown in FIG. 1) that is not associated with the first consumer, but rather associated with at least an entity and/or an individual (such as a vendor) associated with the operation of the first electronic device may be identified. The second communication device is not one of the plurality of electronic devices (101a-101d) that is available for use by the first consumer. In one embodiment, the identification of the second communication device 112 is automatically obtained upon determining the resolution information (see, e.g., block 408 of FIG. 4). In one embodiment, the identification of the second device is based on, at least in part, the resolution information. In one embodiment, the identification of the second communication device is based, least in part, on the type or severity of the adverse event. For example, if the adverse event indicates that an audio output device of the remote device is not fully operational, a first communication device may be identified. Yet in another embodiment, if it is determined that the first consumer (or any consumer) is not able to utilize the first remote device (e.g., client 101a) at all, such as the display device is blank or the device is not accepting credits, then a second communication device may be identified.

Adverse event server 105, or any other device, may comprise computer-executable instructions on one or more non-transitory computer-readable mediums configured to automatically select at least one communication device (such as second communications device 112) associated with the operation of the first remote device. In certain embodiments, the location of a plurality of communications devices associated with the entity or individual responsible for the operation/maintenance of the remote device may be utilized in the identification of the communications device of block 420 or any other process described herein. For example, if it is determined that an entity responsible for the operation/maintenance of the remote device (e.g., client 101a) has two communications devices associated with adverse events with a specific device, the communications device which is closest in proximity to the malfunctioning remote device may be identified. In another embodiment, the communications device (which may be associated with a specific individual) that responded to a previous adverse event with the specific remote device (101a) or another device (e.g., 101b) in a predetermined or predefined area may be selected.

In certain embodiments, the identification of the second communications device 112 is based, at least in part, on diagnostic information. In one embodiment, the electronic information received, such as at block(s) 404, 412, 448 or any other block or mechanism or process, may comprise diagnostic information of the adverse event that is utilized in the identification of the second communications device 112. In further embodiments, the identification may be based, at least in part, on inventory associated with an entity or individual. For example, if the adverse event relates to a defective display device, then a communications device associated with an individual/entity who has the requisite inventory (and/or skills) may be identified as part of block 420. In certain embodiments, a first entity may be responsible for certain adverse events and a second entity may be responsible for other adverse events, therefore, the type or severity of adverse event may be utilized to determine which entity's communication device(s) are identified. Those skilled in the art will appreciate that several factors may contribute to the identification of a specific communications device identified.

Those skilled in the art will appreciate that the first communications device 110 may not communicate to the adverse event server 105 (or with any of remote devices 101a-101d) through network 100, but rather communicate through one or more different communication pathways. Those skilled in the art will further appreciate that the second communications device 112 may not communicate with adverse event server 105 and/or any of the remote devices 101a-101d through network 100. And, although network 100 is shown connected to a plurality of the remote devices 101a-101d, those skilled in the art will appreciate that some devices may not connect to network 100. In fact, it is envisioned that, in certain embodiments, at least one remote device is not configured to communicate with adverse event server 105 through any electronic communication pathway or network.

An electronic notification may be transmitted to the identified second communication device 112 (See, e.g., block 422). The notification may be configured to notify a user of the second communication device 112 that a consumer has experienced an adverse event with the first remote device 101a. In one embodiment, the notification to the second communications device 112 may be automatically transmitted upon the identification of the second communications device 112. In certain embodiments, the notification comprises locational coordinates of the specific remote device. The locational coordinates could be based upon any one or more coordinate system. The location could be provided based upon common descriptions, such as describing the environment or the device itself. In certain embodiments, the notification may be configured to permit a user of the second communications device 112 to geo-locate the remote device 101a, such as by clicking a link.

The notification of block 422 may provide information regarding the adverse event, including any comments or feedback obtained (such as from block 402 and/or 403) as well as any diagnostic information obtained through any mechanism or process, including those known in the art and not explicitly described herein. In certain embodiments, a user of the second communications device 112 may transmit an electronic signal configured to collect further diagnostic information or request further actions, including transmitting notification and/or requests directly to the first communications device 110. Such requests or notifications may relate to diagnostic information, including providing and requesting information.

F. Status Updates

Further aspects of this disclosure relate to transmitting status updates to consumers, including the consumer associated with the first communications device 110. For example, in one embodiment, an electronic notification may be transmitted to the first communications device 112 regarding the status of the first remote device 101a (see, e.g., block 424). In another embodiment, a notification may be transmitted to another device or virtual address associated with the consumer. For example, as part of block 404 or any other mechanism or process, the consumer associated with the first communications device 110 may provide contact information, including email address, phone number, text address, chat profile address, or the like. Therefore, block 424 may transmit a notification that may be received at another device besides the second communications device 112.

In further embodiments, notifications may be transmitted to other devices not associated with the consumer who experienced the specific adverse event. For example, other consumers may be targeted. In one embodiment, a status notification may be transmitted to any other of the plurality of remote devices 101b-101d. This may be advantageous for potential players who would prefer to utilize the first remote device 101a for a variety of reasons as well as potentially reduce wait times for users. In other embodiments, communications devices associated with frequent players, loyalty members, or other groups of consumers may receive one or more notifications regarding the status of any of the plurality of remote devices 101a-101d.

The notification of block 424 may comprise information, selected from one or more of the following: an indication that the electronic device has been fixed, indication of an estimated time that the first electronic device will be fixed, an indication that a repair order has been submitted, indication that the consumer is entitled to a credit, an indication of the status of other devices available for use, contact information of a customer service representative, and combinations thereof.

In certain embodiments, an electronic account associated with the individual (or the first communications device 110) reporting the adverse event may be updated. The account may be utilized to provide the user with credits or virtual rewards. The credit may be specific to the remote device in which the adverse event occurred or may be applied towards one or more other devices. Virtual awards may include a new virtual asset, such as a map for use in a game, such as a game on the same device or another device. In certain embodiments, the account holder may have an option to select between various virtual awards or between credits and awards.

Notifications, such as those transmitted part of block 424 or any other communications between a user of the first communications device 110 and another user, such as a user of the second communications device 112, may be conducted through customized graphical representations, such as avatars. An avatar may be a graphical representation having one or more features of the specific user. For example, a user of adverse event reporting system 300 may be able to select one or more features of their avatar including, but not limited to: facial features, size, body shape, clothing, and/or accessories. Thus, avatars may serve as virtual identities for the respective users of adverse event reporting system 300.

It goes from the foregoing that embodiments disclosed herein relate to an adverse event reporting system. In various embodiments, a remote server, such as adverse event server 105, or any other electronic device, including a mobile or portable device may comprise a processor and one or more non-transitory computer-readable mediums comprising computer-executable instructions that when executed by the processor perform one or more aspects of the system. In one embodiment, a first visual indicia may be placed directly one or in close proximity to a device, such as devices 101a-101d, 200 or 300, such that a consumer may view the indicia when in proximity of device. The indicia may provide a unique identifier that is unique with respect to a first device among a plurality of other devices. The unique identifier of the first remote device may be associated, such as at a remote server 105a, with resolution information comprising an identity of the first device, a first remote location associated with the first device, and at least one second communications device associated with reporting an adverse event with the first device. As discussed above, the first device may be one of a plurality of remote devices that are each associated with visual indicia configured to provide a unique identifier, and wherein neither the first communications device nor the second communications devices are part of the plurality of remote devices.

In certain embodiments, a processing device, including but not limited to a server, may automatically determine that a consumer of the first communications device 110 has experienced an adverse event with the first device (e.g. 110), and in response, selecting one of the at least one second communications devices (e.g. 112) to transmit an electronic notification of the adverse event to. This may be performed automatically upon receiving the first unique identifier from the first communications device 110.

In one embodiment, detecting or analyzing the first indicia on the first remote device may cause the first communications device to be directed to a first virtual address that is specific to the first remote electronic device. The virtual address may cause an output (visual and/or audio) to be presented on the first communications device and/or the first remote device. The virtual address may provide a mechanism for the first consumer to provide information regarding the adverse event. The input may be received from the first communications device, the first remote device or another address. In further embodiments, the virtual address may be associated with the resolution information of the first device, which may be stored on any processing device, including for example, a remote server 105. In one embodiment, the first consumer may be directed to a virtual address before the selection of the second communications device to transmit an electronic notification to. The remote devices may be electronic, mechanical, or electrical mechanical in operation. In one embodiment, at least one remote device is devoid of a transceiver configured to communicate with any other electronic devices.

It further goes from the foregoing, that the above-described embodiments describe methods inclusive of methods that comprise receiving at a processing device, electronic information indicative that a first communications device 110 of a first consumer has transmitted a unique identifier associated with a first remote electronic device 101a or 300, wherein the first remote electronic device 101a is one of a plurality of remote devices 101a-101d that are each associated with a unique identifier and the first communications device 110 is not part of the plurality of remote devices. The electronic information may be received at any processing device, including server 105 or any other device. It may be determined, for example, based upon the reception of the electronic information, that the first consumer experienced an adverse event with the first remote electronic device 101a. This determination may be automatically triggered upon receiving the electronic information. In further embodiments, at least a second communication 112 device associated with a vendor responsible for the operation of the first remote electronic device 101a may be identified. This identification may be automatic. In one embodiment, the identification is automatic based upon the determination that an adverse event occurred. A notification may be transmitted to the second communication device 112 associated with the vendor configured to notify an individual of the vendor that a consumer has experienced an adverse event with the first electronic device 101a, wherein the notification comprises: an identity of the first remote electronic device, and location of the first remote electronic device. Further, a collection of data, such as a database may be stored on a computer-readable medium, such as on server 105. The collection of data may be utilized to determine the status of each of the plurality of remote devices 101a-101d. Status may include whether an adverse event is outstanding, the type of adverse event, whether the second communications device has been successfully reached, whether an individual or entity associated with the second communications device has responded to the adverse event, whether the device(s) has been fixed, and/or any other status. The collection of data may be configured to be viewable on a graphical user interface. The graphical user interface may be configured to permit inquiries to be transmitted to the first or second communication devices, and/or any other device.

I claim:

1. A computer-implemented method comprising:
    receiving electronic information from a first communications device of a first consumer, the electronic information comprising a first unique identifier that was directly wirelessly obtained from a first electronic device among a plurality of electronic devices located at a first location, and the first communications device is not one of the plurality of electronic devices, wherein the electronic information is received from the first communications device of the first consumer without the first consumer knowing either: (1) any contact information for a second communications device associated with at least a first vendor responsible for the operation of the first electronic device; or (2) the individual or entity responsible for remedying an adverse event with the first electronic device;
    based upon the reception of the first unique identifier, automatically determining with a processor that the first consumer of the first communications device experienced an adverse event with one of the plurality of electronic devices;
    with a processor, comparing the first unique identifier against a collection of unique identifiers stored on a non-transitory computer-readable medium, wherein each unique identifier of the collection is associated with one of the plurality of electronic devices and at least one electronic device located at a second location, to identify resolution information of the first electronic device linked to the received first unique identifier, wherein the resolution information comprises:
        an identity of the first electronic device associated with the adverse event, and
        the first location associated with the first electronic device;
    based on, at least in part, the resolution information, automatically identifying a second communication device associated with at least a first vendor responsible for the operation of the first electronic device, wherein the second communications device is not one of the plurality of remote electronic devices; and
    automatically transmitting an electronic notification to the second communication device configured to notify an individual of the second communication device that a consumer has experienced the adverse event with the first electronic device.

2. The method of claim 1, wherein the second communication device is configured to wirelessly communicate with the first electronic device.

3. The method of claim 2, wherein the second communication device is configured to wirelessly communicate directly with the first electronic device.

4. The method of claim 1, wherein the received electronic information comprises contact information of the first consumer associated with the first communications device, the method further comprising:
    after transmitting the electronic notification to the second communications device, transmitting a second electronic notification to the first communications device regarding a status of the first electronic device.

5. The method of claim 4, wherein the received electronic information comprises contact information of the first consumer associated with the first communications device, the method further comprising:
    transmitting at least a portion of the contact information of the first consumer to the second communications device.

6. The method of claim 4, wherein the second notification comprises information selected from the group consisting of: an indication that the electronic device has been fixed, an indication of an estimated time for repair of the first electronic device, and combinations thereof.

7. The method of claim 1, wherein the electronic information comprises an adverse event field configured to comprise diagnostic information relating to the adverse event.

8. The method of claim 1, further comprising:
    receiving diagnostic information from the first communications device that was wirelessly obtained directly from the first electronic device.

9. The method of claim 1, further comprising:
    causing wireless transmission to be transmitted the first electronic device, requesting at least one of:
    permission to utilize a communication pathway of the first communications device to transmit diagnostic information regarding the first electronic device; or
    request to perform a physical activity regarding the first electronic device.

10. The method of claim 1, further comprising:
    after receiving the first unique identifier, automatically attempting to obtain electronic diagnostic information from the first electronic device.

11. The method of claim 7, further comprising:
    automatically transmitting the diagnostic information to the second communications device.

12. The method of claim 7, wherein the diagnostic information comprises information transmitted by the first communication device.

13. The method of claim 1, wherein the electronic information comprises diagnostic information of the adverse event and the identification of the second communications device is based, at least in part, on the diagnostic information.

14. The method of claim 1, further comprising:
directing the first communications device to a first virtual address specific to the first unique identifier, wherein the first virtual address is configured to receive adverse event information from the first communications device.

15. An adverse event reporting system comprising:
a remote server comprising a processor and one or more non-transitory computer-readable mediums comprising computer-executable instructions that when executed by the processor performs at least:
associating a first electronic signature configured to be transmitted by a first remote electronic device experiencing an adverse event and further configured to be captured directly by an electronic sensor of a first communications device and analyzed by a processor to provide a unique identifier of the first remote electronic device with resolution information comprising an identity of the first remote electronic device, a first remote location associated with the first electronic device, and at least one second communications device associated with reporting an adverse event with the first remote electronic device;
wherein the first remote electronic device is one of a plurality of remote devices that are each associated with an electronic signature configured to provide a unique identifier, and wherein neither the first communications device nor the second communications devices are part of the plurality of remote devices;
upon receiving the first unique identifier from the first communications device at the remote server, automatically determining that a consumer of the first communications device has experienced an adverse event with the first electronic device, and in response, selecting one of the at least one second communications devices to transmit an electronic notification of the adverse event to; and
transmitting the notification to the selected second communications device configured to notify a user of the second communications device of an adverse event with the first remote electronic device.

16. The system of claim 15, wherein the first electronic signature is configured such that upon being received by the first communications device, causes the first communications device to be directed to a first virtual address that is specific to the first remote electronic device, the system further including a non-transitory computer-readable medium comprising computer-executable instructions that when executed by the processor performs at least:
presenting visual output on a display device of either the first communications device or the first remote electronic device as a result of being directed to the first virtual address;
capturing information from the first communications device or the first remote electronics device inputted by the first consumer associated with the first communications device regarding the adverse event with the first remote electronic device; and
associating the first virtual address with the resolution information of the first electronic device.

17. The system of claim 16, wherein presenting of the visual output on a display device as a result of being directed to the first virtual address occurs before selecting one of the at least one second communications devices to transmit an electronic notification to.

18. The system of claim 15, wherein the plurality of remote devices comprises a second remote device that is devoid of a transceiver configured to communicate with a remote device but is configured to permit direct wireless communication with the first communications device when the first communications device is within a proximity threshold of the first communications device.

19. The system of claim 15, wherein the plurality of remote devices comprise a second remote device is configured to provide a unique identifier without requiring a consumer to utilize a digital image sensor.

20. The system of claim 15, further comprising:
transmitted to the first electronic device, requesting at least one of:
permission to utilize a communication pathway of the first communications device to transmit diagnostic information regarding the first electronic device; or
requesting the first consumer to perform a physical activity regarding the first electronic device.

* * * * *